US009560160B1

United States Patent
Kolam et al.

(10) Patent No.: US 9,560,160 B1
(45) Date of Patent: Jan. 31, 2017

(54) PRIORITIZATION OF THE DELIVERY OF DIFFERENT PORTIONS OF AN IMAGE FILE

(71) Applicant: Instart Logic, Inc., Mountain View, CA (US)

(72) Inventors: Hariharan Kolam, Palo Alto, CA (US); Brian Kennedy, Mountain View, CA (US)

(73) Assignee: Instar Logic, Inc., Palo Alto, CA (US)

( * ) Notice: Subject to any disclaimer, the term of this patent is extended or adjusted under 35 U.S.C. 154(b) by 392 days.

(21) Appl. No.: 14/158,324

(22) Filed: Jan. 17, 2014

(51) Int. Cl.
| H04L 29/08 | (2006.01) |
| H04N 19/12 | (2014.01) |
| H04L 29/06 | (2006.01) |
| H04N 19/172 | (2014.01) |

(52) U.S. Cl.
CPC ............. H04L 67/322 (2013.01); H04L 67/42 (2013.01); H04N 19/12 (2014.11); H04N 19/172 (2014.11)

(58) Field of Classification Search
None
See application file for complete search history.

(56) References Cited

U.S. PATENT DOCUMENTS

| 7,231,082 B2 * | 6/2007 | Lenoir | G06F 17/243 235/379 |
| 7,647,593 B2 * | 1/2010 | Matsumoto | H04L 67/1008 712/203 |
| 8,599,432 B2 * | 12/2013 | Mestha | G03G 13/01 358/1.9 |
| 8,612,517 B1 * | 12/2013 | Yadid | H04N 21/25891 709/201 |
| 8,645,485 B1 * | 2/2014 | Yadid | H04N 21/25891 709/203 |
| 2002/0056131 A1 * | 5/2002 | Hayashi | G06F 17/30905 725/115 |
| 2004/0014460 A1 * | 1/2004 | Moroo | G06T 1/0021 455/414.1 |
| 2004/0101086 A1 * | 5/2004 | Sabol | A61B 5/4872 378/4 |
| 2004/0249565 A1 * | 12/2004 | Park | G01C 21/36 701/410 |
| 2005/0057648 A1 * | 3/2005 | Ambiru | H04N 7/185 348/143 |
| 2005/0226252 A1 * | 10/2005 | Tomita | H04L 47/10 370/395.42 |
| 2008/0071877 A1 * | 3/2008 | Beach | G06F 17/3028 709/207 |
| 2008/0291479 A1 * | 11/2008 | Mestha | G03G 13/01 358/1.9 |

(Continued)

OTHER PUBLICATIONS

Jain et al., Score Normalization in Multimodal Biometric Systems, Pattern Recognition 38, 2005, pp. 2270-2285.

(Continued)

*Primary Examiner* — Ninos Donabed
(74) *Attorney, Agent, or Firm* — Van Pelt, Yi & James LLP

(57) ABSTRACT

Prioritizing delivery of different portions of images is disclosed, including: receiving a request for an image file; identifying a cluster of characterized images in an N-dimensional space to which the image file belongs; assigning a split point to the image file that is associated with the identified cluster of characterized images; and prioritizing a delivery of a first portion and a second portion of the image file based at least in part on the assigned split point.

19 Claims, 11 Drawing Sheets

(56) References Cited

U.S. PATENT DOCUMENTS

| | | | | |
|---|---|---|---|---|
| 2008/0291480 | A1* | 11/2008 | Mestha | G03G 13/01 358/1.9 |
| 2009/0044116 | A1* | 2/2009 | Kitabayashi | G06F 3/048 715/716 |
| 2009/0202167 | A1* | 8/2009 | Muijs | H04N 1/409 382/254 |
| 2011/0106881 | A1* | 5/2011 | Douville | G06F 8/61 709/203 |
| 2011/0228848 | A1* | 9/2011 | Dvir | H04N 19/172 375/240.12 |
| 2011/0246996 | A1* | 10/2011 | Tunning | G06F 9/4881 718/103 |
| 2011/0258344 | A1* | 10/2011 | Mukherjee | H04N 19/17 709/247 |
| 2012/0201475 | A1* | 8/2012 | Carmel | H04N 19/172 382/238 |
| 2012/0229655 | A1* | 9/2012 | Solomon | H04N 5/23225 348/207.1 |
| 2013/0257883 | A1* | 10/2013 | Krig | G06T 1/20 345/506 |
| 2014/0241629 | A1* | 8/2014 | Lerios | G06T 9/00 382/166 |
| 2015/0030237 | A1* | 1/2015 | Jancsary | G06K 9/6282 382/159 |
| 2015/0131898 | A1* | 5/2015 | Schelten | G06T 5/003 382/159 |

OTHER PUBLICATIONS

Author Unknown, Rec. ITU-R, BT.500-11, Recommendation ITU-R BT.500-11, Methodology for Subjective Assessment of the Quality of Television Pictures, 2002.

Chen et al., Image Categorization by Learning and Reasoning with Regions, Journal of Machine Learning Research, 5, 2004, pp. 913-939.

Frey et al., Clustering by Passing Messages Between Data Points, Science vol. 315, Feb. 16, 2007, pp. 972-976.

Ahammad et al., QoE-Driven Unsupervised Image Categorization for Optimized Web Delivery, Aug. 27, 2014.

Hartigan et al., A K-Means Clustering Algorithm, Applied Statistics, 1979, pp. 100-108.

Author Unknown, HTTPArchive, 2014.

Shotton et al., Semantic Texton Forests for Image Categorization and Segmentation, Proceedings of IEEE Conference on Computer Vision and Pattern Recognition (CVPR), 2008.

Hans Marmolin, Subjective MSE Measures, IEEE Transactions on Systems, Man, Cybernetics, vol. SMC-16, No. 3, May/Jun. 1986.

Author Unknown, Media Queries, What is Media Queries, 2014.

Bradley et al., Scaling EM (Expection-Maximization) Clustering to Large Databases, Microsoft Research Technical Report, MSR-TR-98-35, Nov. 1998.

Rauschenbach et al., Adaptive Image Transmission, Proceedings of International Conference in Central Europe, on Computer Graphics and Visualization, (WSCG), Feb. 10-14, 1997, pp. 434-443.

Chandra et al., Differentiated Multimedia Web Services Using Quality Aware Transcoding, Proceedings of the Nineteenth Annual Joint Conference of the IEEE Computer and Communications Societies (INFOCOM), 2000, pp. 961-969.

Tammy Everts, The Average Web Page has Almost Doubled in Size Since 2010, WebPerformanceToday, Jun. 5, 2013.

Wang et al., Image Quality Assessment: From Error Visibility to Structural Similarity, IEEE Transactions on Image Processing, vol. 13, No. 4, Apr. 2004, pp. 600-612.

Ahammad et al., QoE-Driven Unsupervised Image Categorization for Optimized Web Delivery, Apr. 16, 2014.

Richard L. Gregory, Princeton Science Library; Eye and Brain, The Psychology of Seeing, Fifth Edition 1997 ISBN-10: 0-691-04837-1. Entire Book is Being Submitted.

* cited by examiner

```
<html>
  <head>
    <title>Welcome</title>
  </head>
  <body>
    <h1>HelloWorld </h1>
         .
         .
         .
    <img src = "url for image"/>
    <video>
       <source src = "url for video" type = "video/ogg"  />
    </video>
    <script type = "text/javascript">
    <!--script
    *** Some javascript code is placed here ***
    -->
    </script>
  </body>
</html>
```

Script

FIG. 9

PRIORITIZATION OF THE DELIVERY OF DIFFERENT PORTIONS OF AN IMAGE FILE

BACKGROUND OF THE INVENTION

In at least some conventional systems, an image to be rendered is completely downloaded before the resources (e.g., client-server connection) used to download/render the image can be used to download/render another image. However, especially when there are several images to be downloaded and fewer available resources than are needed to concurrently download every image to completion, the end-user desiring to view the images may suffer a lower quality user experience by virtue of having to wait a potentially long time to view all the images.

BRIEF DESCRIPTION OF THE DRAWINGS

Various embodiments of the invention are disclosed in the following detailed description and the accompanying drawings.

FIG. 9 shows an example of a webpage described by an HTML file.

DETAILED DESCRIPTION

Figure 1:
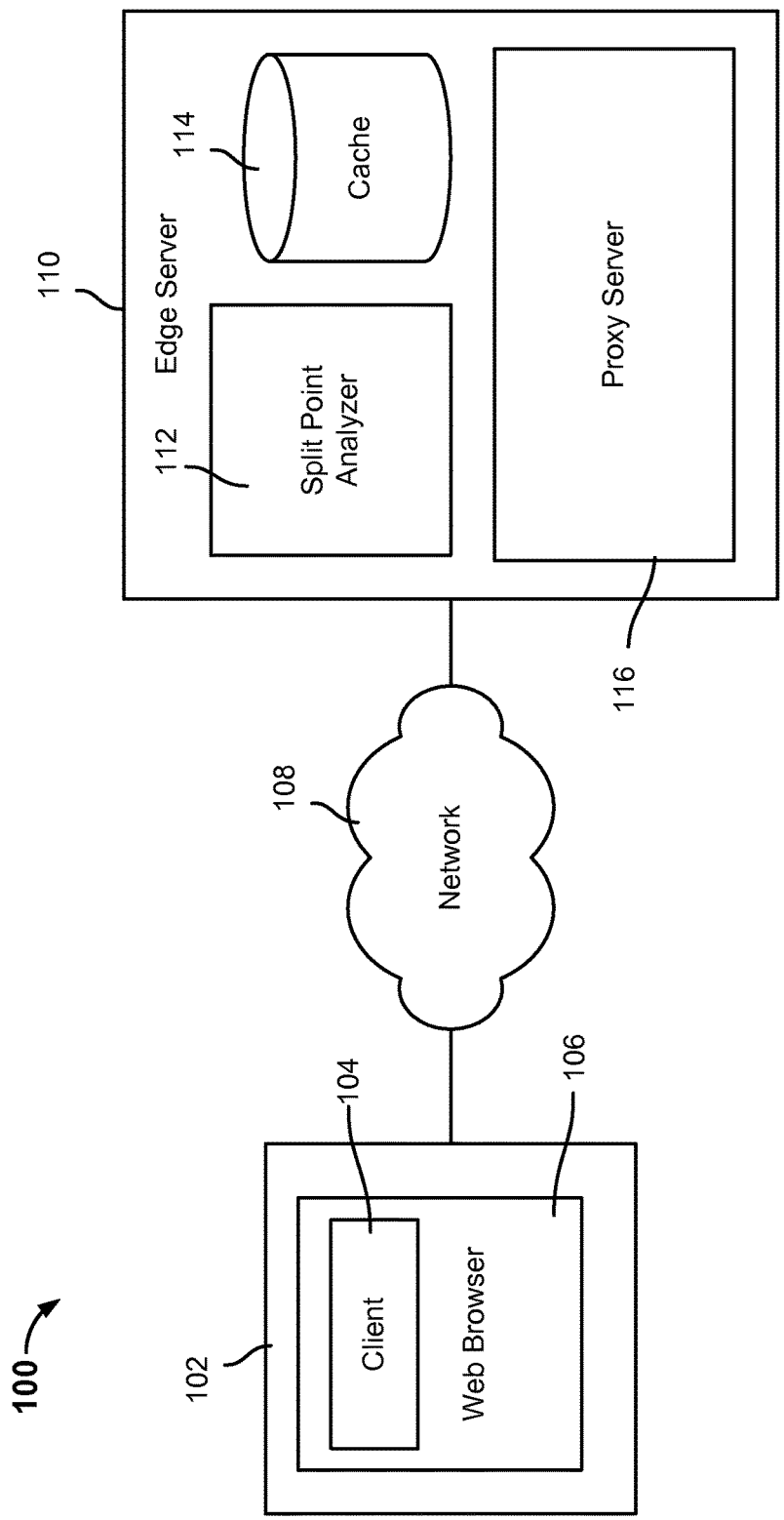
FIG. 1 is a diagram showing an embodiment of a system for prioritization of the delivery of different portions of an image file.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of prioritization of the delivery of different portions of an image file are described herein. A request for an image file is received. A cluster of characterized images in an N-dimensional space to which the image belongs is identified. The image file is assigned a split point that is associated with the identified cluster of characterized images. In various embodiments, a "split point" refers to a measure of a portion of an image file to deliver first to the requestor in the prioritized delivery of different portions of the image file. For example, the split point may refer to a percentage of the image file. The split point may refer to a percentage of the image file starting from the lower frequency components of a progressive image file (e.g., starting from the beginning of the discrete cosine transform (DCT) encoded data of a progressive image file).

In some embodiments, a requested image file is delivered as one or more portions of the image file. Because the delivery of a portion of an image file at a time is more efficient than the delivery of the entire image file, the delivery of a portion of the image file is desirable if the delivered portion can be rendered into an acceptable, even if degraded, version of the original image. For example, in response to the request for an image file, a first portion of the image file that is determined based on a split point assigned to the image file is delivered. The first portion of the image file is delivered and to be rendered by the requestor. So long as the first portion of the image file includes less than the entire image file, the rendering of the first portion of the image file will be a degraded version of the rendering of the entire image file. However, in various embodiments, the split point is automatically determined on the basis that a first portion of the image file generated with the split point will be rendered into a degraded but still acceptable (e.g., aesthetically pleasing) version of the original image.

In some embodiments, a client-server system is used to virtualize a document object model (DOM) of a web browser. Virtualization of a DOM of a web browser allows the client-server system to take control of the DOM for different kinds of optimizations, while keeping the optimization transparent to other code running within the web browser. When the web browser sends any network messages over a network that are related to the downloading of webpages or other information, the messages may be either intercepted and processed by the client (e.g., a JavaScript program that is running at the device on which the web browser is running), or directly received and then processed by a server supporting virtualization. For example, the prioritization of different portions of the delivery of the image file included in the DOM may be implemented using the client-server system.

FIG. 1 is a diagram showing an embodiment of a system for prioritization of the delivery of different portions of an image file. In the example, system 100 includes device 102, network 108, and edge server 110. Device 102 further includes client 104 and web browser 106. In some embodiments, client 104 is running within web browser 106, which is running on device 102. Network 108 may be any combination of public or private networks, including intranets, local area networks (LANs), wide area networks (WANs), radio access networks (RANs), Wi-Fi networks, the Internet, and the like. Edge server 110 includes split point analyzer 112, cache 114, and proxy server 116. Device 102 is connected to edge server 110 through network 108. Examples of device 102 include laptop computers, desktop computers, tablet computers, smartphones, and other mobile devices.

A webpage accessed by web browser 106 may be described by different markup languages, including Hypertext Markup Language (HTML), Extensible Markup Language (XML), and the like. The webpage may also be described by different scripting languages, including JavaScript Object Notation (JSON), and the like. The webpage may be described by other custom languages as well. HTML is used hereinafter as an example of the various languages for describing webpages. Note that the examples of HTML are selected for illustration purposes only; accordingly, the present application is not limited to these specific examples.

For example, in response to an end-user interaction with device 102 to request a webpage, web browser 106 is configured to send a (e.g., Hypertext Transfer Protocol or HTTP) request message to edge server 110 requesting the HTML webpage file. After edge server 110 locates the requested HTML webpage file, edge server 110 returns the requested HTML webpage file in an HTTP response message to web browser 106. In some embodiments, web browser 106 begins to render the webpage on a screen, web browser 106 parses the received webpage file and builds a data structure to represent the various components of the webpage in a local memory. As will be further described below, one such data structure is a DOM tree.

In some embodiments, client 104 may be injected into web browser 106 based on standards-based (e.g., HTML or JavaScript) procedures. For example, after edge server 110 receives a request from web browser 106 requesting an HTML webpage file, edge server 110 may parse the HTML webpage file, inject client 104 into the HTML webpage file, and then send the response back to web browser 106. In some embodiments, client 104 may be injected by adding JavaScript client code in the head section of the HTML webpage file.

After receiving the requested webpage file, web browser 106 is configured to fetch an image included in the webpage file from a uniform resource locator (URL) associated with the origin server associated with the image. Accordingly, web browser 106 sends a request via network 108, requesting the image file to be downloaded. In some embodiments, when web browser 106 sends any network messages onto network 108 that are related to the downloading of images or other information, the messages may be either intercepted and processed by a client 104 or directly received and then processed by edge server 110 to enable the prioritization of delivering different portions of the images. For example, method API calls by web browser 106 or any JavaScript code to manipulate the image file related objects in a DOM tree may be intercepted, processed, or modified by client 104.

The following describes examples of an image being requested by web browser 106 and the different portions of the image being delivered in a prioritized manner:

Web browser 106 is configured to request an image file. In some embodiments, the request for the image is generated in response to an event. For example, the event can be an end-user interaction with a webpage to which web browser 106 has rendered or the event can be part of the process of web browser 106 attempting to retrieve the image file related object in a DOM tree that has been built for a requested webpage. In some embodiments, web browser 106 is configured to send the request for the image file directly to edge server 110. In some embodiments, the request for the image file generated by web browser 106 is intercepted by client 104 and potentially modified before client 104 sends the (modified) request to edge server 110.

Edge server 110 receives the request for the image file. In some embodiments, proxy server 116 of edge server 110 determines whether it has previously received a request for the image file (e.g., from an entity running at device 102 or any other device) and/or determines that the split point for the requested image file is already stored.

In the event that proxy server 116 determines that it has not previously received a request for the image file or that the split point for the requested image file is not already stored, in some embodiments, proxy server 116 is configured to obtain the image file. For example, the requested image file may be obtained from cache 114 (if a copy of the requested image file is already stored in cache 114) of edge server 110 or the requested image file may be obtained from the origin server (a server that is not shown in the diagram) associated with the requested image file based on a locator (e.g., uniform resource locator (URL)) that is included in the request. Once proxy server 116 has obtained the requested image file, proxy server 116 is configured to send back to web browser 106 at least a portion of the requested image file based on a user configurable determination. Because proxy server 116 has not previously received a request for that image file and therefore has not previously determined and stored the split point for the image file, to ensure a good user experience for the end-user who is to view the rendered image file at device 102, in some embodiments, the user configurable determination may be configured to return a conservative at least portion of the image file to web browser 106. For example, the user configurable determination may return the entire image file or a large percentage (e.g., 80% or 90%) of the image file to web browser 106 such that the image to be rendered by web browser 106 is assumed to appear visually pleasing (e.g., because the image is rendered based on the entire requested image file or a large portion of the requested image file). In addition to returning at least a portion of the requested image file to web browser 106, proxy server 116 is configured to send the obtained requested image file to split point analyzer 112. In some embodiments, proxy server 116 is also configured to store the requested image file at cache 114. As will be described in further detail below, split point analyzer 112 is configured to determine a split point that is appropriate for the image file. In some embodiments, a corresponding relationship is stored at edge server 110 (e.g., in cache 114) between the image file and its corresponding determined split point. In some embodiments, the first portion and/or the second portion (the second portion comprises the remainder portion of the image file without the first portion) of the image file in accordance with the determined split point of the image file is stored in cache 114. The stored corresponding relationship between the image file and its corresponding determined split point and/or the stored first and/or portions of the image file may be used in response to a subsequent request for that image file, as is described below.

In the event that proxy server 116 determines that it has previously received a request for the image file and/or that the split point for the requested image file is already stored, in some embodiments, proxy server 116 is configured to determine the first portion of the requested image and deliver the first portion to web browser 106. In this case where the split point has been previously determined for a requested image file, the first portion of the image file that is determined based on the stored split point can be efficiently delivered to web browser 106 instead of based on a potentially conservative user configurable determination. In some embodiments, proxy server 116 is configured to obtain a cached copy of the first portion of the requested image file from cache 114. In some embodiments, proxy server 116 is configured to obtain the split point based on a corresponding relationship between the image file and its corresponding split point stored at cache 114. Then, proxy server 116 is configured to determine the first portion of the requested image file based on the obtained split point and a cached copy of the requested image file. In some embodiments, proxy server 116 may or may not deliver the second portion of the requested image file to web browser 106 depending on one or more factors, as will be described further below.

Figure 2:
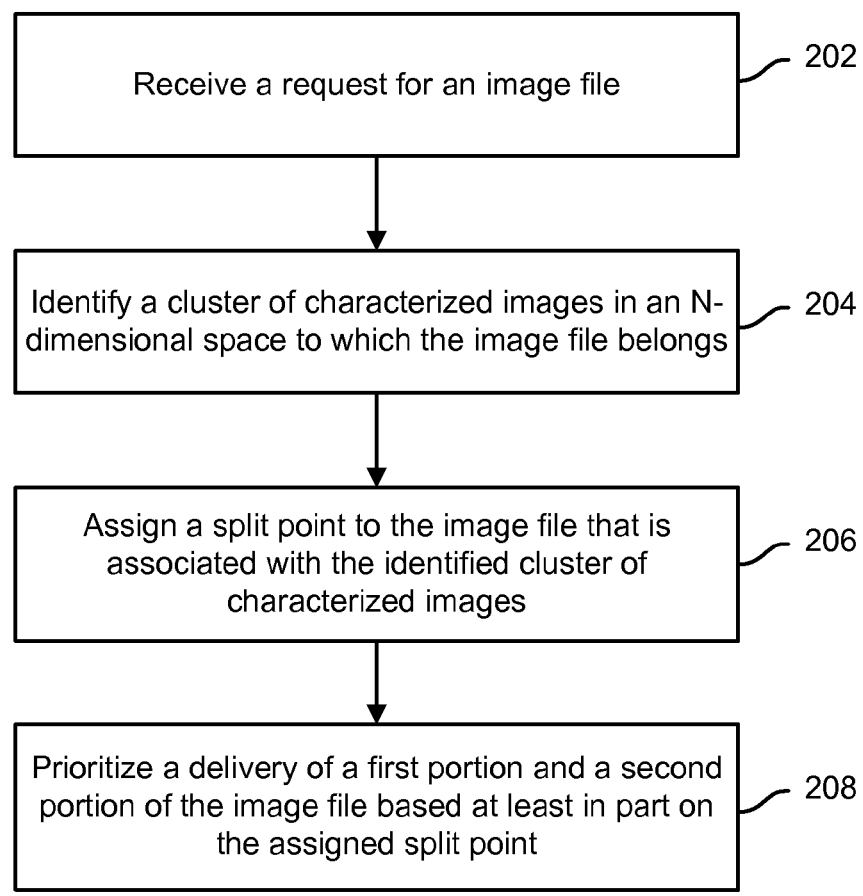
FIG. 2 is a flow diagram showing an embodiment of a process for prioritizing the delivery of an image file.

FIG. 2 is a flow diagram showing an embodiment of a process for prioritizing the delivery of an image file. In some embodiments, process 200 is implemented at system 100 of FIG. 1. Specifically, in some embodiments, process 200 is implemented at edge server 110 of system 100 of FIG. 1.

At 202, a request for an image file is received. For example, the request for the image file is received from a web browser or a client injected into the web browser. In some embodiments, the requested image file comprises a progressive image file or is in a format that can be converted into a progressive image file.

At 204, a cluster of characterized images in an N-dimensional space to which the image file belongs is identified. In various embodiments, a plurality of images has been sorted into various clusters in an N-dimensional space where similar images are sorted into the same cluster. The value of N may be determined based on one or more factors. Because these images have been analyzed and clustered, in various embodiments, they are referred to as "characterized images" or "known images." In some embodiments, a split point is assigned to each cluster of images. For example, the split point may be manually assigned by a user (e.g., a system operator) to one or more images in a cluster based on a manual evaluation that the chosen split point is the minimum split point that yields a first portion of each of the one or more images that can be rendered into images of an acceptable quality. The standard of "acceptable quality" may be chosen by the user. Then the remaining images of the cluster inherit the same split point assigned to those one or more images by virtue of belonging to the same cluster of images. The remaining images of the cluster inherit the same split point assigned to those one or more images by virtue of belonging to the same cluster of images because it is assumed that since images of a cluster are similar, the split point appropriate for one image is also appropriate for the others of the same cluster. Put another way, one split point is assigned to each cluster of images and each image in the cluster is associated with the split point assigned to that cluster.

In some embodiments, if the requested image has not been previously clustered, it is sometimes referred to as an "unknown image." In some embodiments, one or more candidate split points are determined and a candidate first portion of the unknown image file is generated based on each candidate split point. For example, the one or more candidate split points are predetermined percentages (e.g., 40%, 50%, 60%, 70%, 80%, and 90%) of the unknown image file that are used as candidate first portions of the image file. In some embodiments, one or more metric values are determined for each of the candidate first portions of the unknown image file. For example, the value of N is equal to the number of candidate first portions multiplied by the number of types of metric values determined for each candidate first portion. For example, if there were six candidate first portions of the unknown image file and two types of metric values were determined for each candidate first portion, then N=6*2=12. A coordinate in N-dimensional space can be determined for the unknown image file. In some embodiments, the coordinate in N-dimensional space may be represented by a data structure (e.g., vector) that includes all the metric values computed for each candidate first portion. Then, a cluster of characterized images to which the unknown image belongs in the N-dimensional space is determined based at least in part on the data structure. For example, the unknown image file is determined to belong to a cluster with which the N-dimensional data structure is determined to be within a predetermined threshold (e.g., Euclidean) distance.

At 206, a split point that is associated with the identified cluster of characterized images is assigned to the image file. In some embodiments, the unknown image file inherits the split point that was assigned to the cluster of characterized images to which the unknown image file was identified to belong. For example, the split point assigned to the identified cluster can be any one of the predetermined percentages (e.g., 40%, 50%, 60%, 70%, 80%, and 90%) of the unknown image file to use to determine the first portion of the image to deliver in a prioritized delivery of different portions of the image file. In some embodiments, the split point assigned to the unknown image file is stored so that it can be obtained upon a subsequent request for the same image.

At 208, a delivery of a first portion and a second portion of the image file is prioritized based at least in part on the assigned split point. The first portion of the requested image file is determined based on the split point that is assigned to that image file. In some embodiments, the first portion of the requested image file is sent to the requestor prior to sending the second portion (e.g., the remaining portion of the image file) to the requestor, at a later time, or not at all, depending on one or more factors.

Because the first portion of the requested image file is smaller than the entire image file, the first portion will be received and rendered sooner at the requestor than if the entire image file had been sent. The first portion of the image file was determined based on the split point selected for the cluster of characterized images to which it was determined to belong and is assumed to represent a portion of the original image that includes enough information to be rendered by the requestor as an acceptable, even if, degraded version of the original image. Thus, determining the first portion of the requested image file can result in an efficient delivery of less than the entire image file that can still be rendered in a manner that can provide a quality user experience with respect to viewing the image.

Figure 3:
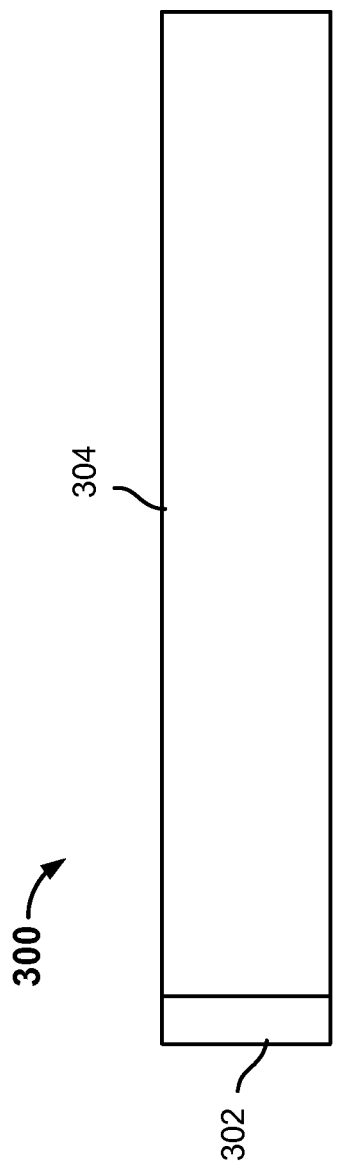
FIG. 3 is a diagram showing an example of a progressive image file format.

FIG. 3 is a diagram showing an example of a progressive image file format. In the example of FIG. 3, progressive image file 300 includes metadata 302 and body 304. An example of a progressive image file is a progressive JPEG file. A progressive image file comprises a compressed image that is encoded in a format such that the image file is divided into a series of scans. The first scan shows the image at a lower quality, and the following scans gradually improve the image quality. For example, an image in progressive JPEG format is encoded in multiple passes of progressively higher detail. The initial passes include lower frequency components of the image (near metadata 302), while the subsequent passes (away from metadata 302) include higher frequency components of the image. Rendering an image in a progressive JPEG format shows a reasonable preview of the image after a first pass of rendering of the lower frequency components of the image, with the image progressively turning sharper with higher detail after subsequent passes. Thus, even a portion (less than the whole) of progressive image file 300 can be rendered into an image, albeit a degraded copy of the original image that could be rendered with the entire progressive image file 300. In some embodiments, an appropriate split point/first portion can be determined for the progressive image file as a percentage of the file starting from the lower frequency components of the file that is presumed to include enough of the progressive image file to render into a degraded but acceptable image at the requestor of the image.

Figure 4:
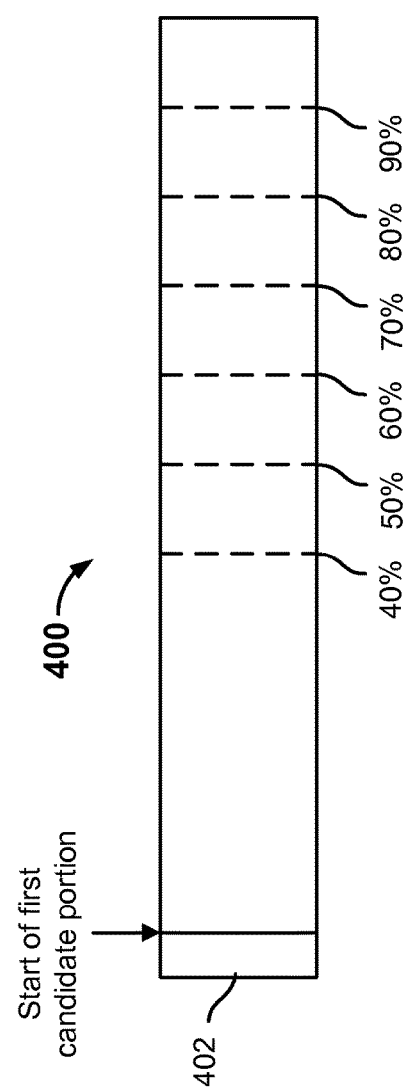
FIG. 4 is a diagram showing an example of various candidate split points in a progressive image file.

FIG. 4 is a diagram showing an example of various candidate split points in a progressive image file. While any type of split points can be used, for purposes of illustration, the use of a percentage-based split point is described herein. Six candidate split points are depicted in the example of FIG. 4, although in practice, any number of candidate split points may be used. Each of candidate split points 40%, 50%, 60%, 70%, 80%, and 90% represents a percentage of progressive image file 400 from the depicted start of a first candidate portion, which in this example, is a point of the image file subsequent to metadata 402. Each of candidate split points 40%, 50%, 60%, 70%, 80%, and 90% also represents the amount of progressive image file 400 that is included in a corresponding candidate first portion of the file. For example, for the candidate split point of 40%, 40% of progressive image file 400 from the point subsequent to metadata 402 comprises the corresponding candidate first portion that will be delivered first and the remaining 60% of the progressive image file 400 comprises the second portion that will be delivered after the first portion (if at all). While a lower percentage candidate split point will be associated with a smaller candidate first portion and therefore a candidate first portion that will be more efficiently delivered to/rendered at the requestor, the lowest percentage candidate split point may not yield a first portion of the image that meets a required standard (e.g., of acceptable end-user viewing). Furthermore, manual determination of the appropriate split point for each image file is laborious and inefficient. Therefore, as will be described in further detail below, a split point is automatically selected among multiple candidate split points for an image file. For example, a split point is automatically selected from the six candidate split points of 40%, 50%, 60%, 70%, 80%, and 90% for an image file.

Figure 5:
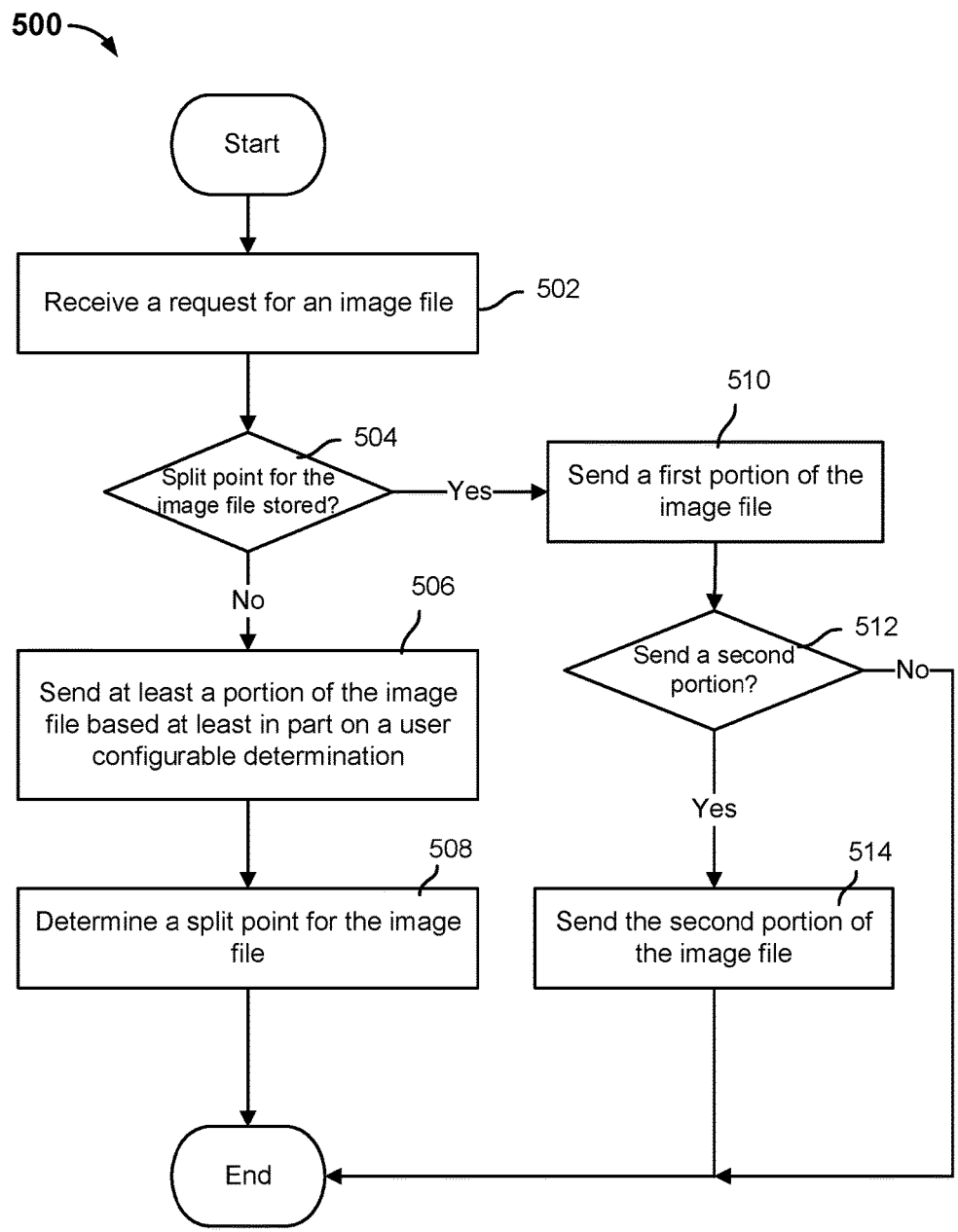
FIG. 5 is a flow diagram showing an example of a process for prioritizing the delivery of different portions of an image file.

FIG. 5 is a flow diagram showing an example of a process for prioritizing the delivery of different portions of an image file. In some embodiments, process 500 is implemented at system 100 of FIG. 1. Specifically, in some embodiments, process 500 is implemented at edge server 110 of system 100 of FIG. 1.

At 502, a request for an image file is received. A request for an image file is received from a requestor. For example, the requestor comprises a web browser or a client (e.g., JavaScript) that has been injected in a web browser. The request may include identifying information (e.g., a URL) associated with the image file.

At 504, it is determined whether a split point has been stored for the image file. In the event that a split point has been stored for the image file, control is transferred to 510. Otherwise, in the event that a split point has not been stored for the image file, control is transferred to 506. For example, a split point may already be stored for the image file if a request for the image file has been previously received and an appropriate split point had been determined and stored for the image file. However, a split point may not already be stored for the image file, for example, if a request for the image file has not been previously received and/or a split point has not previously been determined for the image file.

At 506, at least a portion of the image file is sent based at least in part on a user configurable determination. If the split point of the image file is not stored, then at least a portion of the image file (e.g., after the image file is obtained from its origin server) is delivered based on a user configurable determination. For example, the user configurable determination may indicate to send a conservative at least portion of the image file (e.g., most of the image file or even the entire image file) to deliver to the requestor such that the rendered image will be a relatively high or of the highest possible quality to ensure a good user experience in viewing the requested image. The user configurable determination may also indicate to deliver a remaining portion of the image file at a later time, based on one or more factors, if less than the entire image file is initially delivered.

At 508, a split point for the image file is determined. A split point for the image file is determined and stored for a subsequent request for the same image file. In some embodiments, after the split point is determined, a first portion and/or a second portion of the image file is cached.

At 510, a first portion of the image file is sent. In some embodiments, a first portion of the image file is dynamically determined based on a copy of the image file and the stored split point and sent. In some embodiments, a cached copy of the first portion of the image file is obtained and sent.

At 512, it is determined whether to send a second portion of the image file. In the event that the second portion is to be sent, control is transferred to 514, where the second portion of the image file is sent. Otherwise, in the event that the second portion is not to be sent, process 500 ends. The second portion of the image file is the remaining portion of the image file less the already sent first portion. In some embodiments, whether to send a second portion of the image file such that the entire image file could be rendered at the requestor is determined based at least in part on end-user actions. For example, during a browsing session, an end-user may scroll to the bottom of a webpage before the webpage is loaded to completion such that the image file is no longer within the displayed portion of the webpage. Also for example, an end-user may expand or minimize certain portions of the webpage such that the image file is no longer within the displayed portion of the webpage. As a result, if the image file is no longer needed at the requestor (e.g., because the image file is no longer within the displayed portion of the webpage) after the first portion has been sent, the second portion of the image file may not be sent at all.

However, if the image file is still needed at the requestor after the first portion has been sent, then based on one or more factors (e.g., the availability of connection resources), the second portion of the image file may be sent to the requestor. In some embodiments, a request for the second portion of the image file may be received from the requestor (e.g., after network traffic has subsided). In some embodiments, a request for the second portion of the image file is not received from the requestor but rather, the edge server automatically determines whether to send the second portion of the image file.

Figure 6:
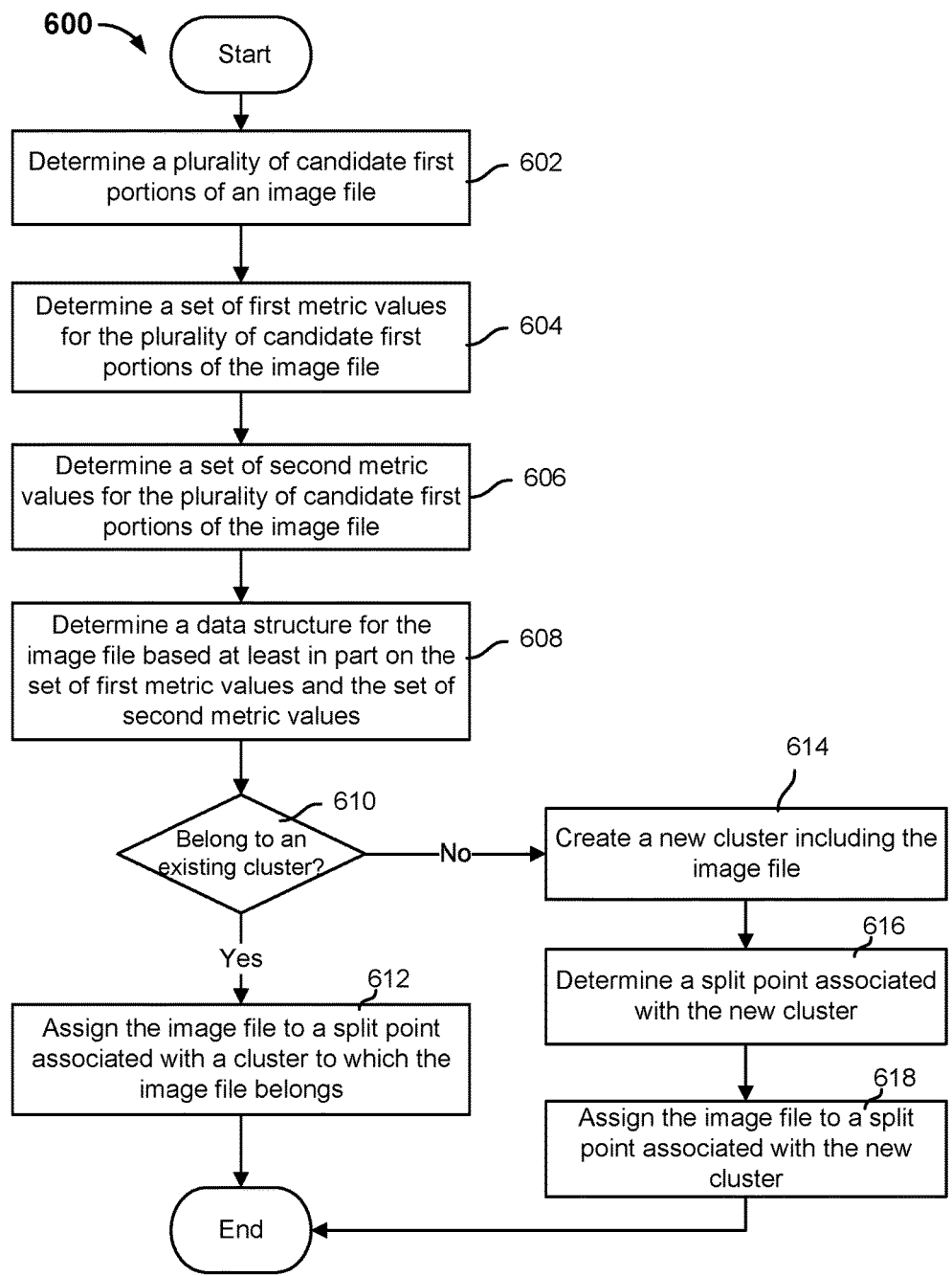
FIG. 6 is a flow diagram showing an embodiment of a process for determining whether an image file belongs to a cluster of characterized images.

FIG. 6 is a flow diagram showing an embodiment of a process for determining whether an image file belongs to a cluster of characterized images. In some embodiments, process 600 is implemented at system 100 of FIG. 1. In some embodiments, step 508 of process 500 of FIG. 5 is implemented using process 600.

Process 600 is an example process that may be used to determine a split point for an image file for which a split point is not stored.

At 602, a plurality of candidate first portions of an image file is determined. If the image file is not stored, then the image file is obtained from its origin server. In some embodiments, a set of one or more predetermined candidate split points is used to generate corresponding candidate first portions of the image file. For example, the predetermined split points and corresponding candidate first portions may include 40%, 50%, 60%, 70%, 80%, and 90% of the image file.

At 604, a set of first metric values for the plurality of candidate first portions of the image file is determined. In some embodiments, a first metric comprises a first type of metric. A first metric value is determined for each candidate first portion. For example, if the six candidate first portions of the image file are 40%, 50%, 60%, 70%, 80%, and 90%, then a first metric value would be computed for each of the 40%, 50%, 60%, 70%, 80%, and 90% candidate first portions of the image file. In various embodiments, the first type of metric measures a difference between an image rendered by the first candidate portion of the image file and the original (entire) image file.

For example, the first type of metric may be a measure of structural similarity (SSIM) of a candidate first portion relative to the original image file. SSIM is obtained by comparing the local patterns of pixel intensities that have been normalized for luminance and contrast between the original image and the degraded image rendered with a candidate first portion of the original image file. In some embodiments, a SSIM value is computed for each of various local windows applied to the degraded image rendered with a candidate first portion and then a mean SSIM index value is determined for the candidate first portion by averaging all the SSIM values associated with the local windows.

At 606, a set of second metric values for the plurality of candidate first portions of the image file is determined. In some embodiments, a second metric comprises a second type of metric, different from the first type of metric. A second metric value is determined for each candidate first portion. For example, if the six candidate first portions of the image file are 40%, 50%, 60%, 70%, 80%, and 90%, then a second metric value would be computed for each of the 40%, 50%, 60%, 70%, 80%, and 90% candidate first portions of the image file. In various embodiments, the second type of metric may measure a difference between an image rendered by the first candidate portion of the image file and the original (entire) image file.

For example, the second type of metric may be a measure of peak signal-to-noise ratio (PSNR) that describes the quality of an image rendered by the first candidate portion of the image file relative to the original image file. The PSNR is defined as a function of the maximum possible pixel value of the image and the mean squared error (MSE). The MSE of an image rendered with a candidate first portion of the image file can be determined, for example, by squaring the difference between each pixel of the image rendered with a candidate first portion and the original image and then taking a mean of the squared errors. For example, the maximum possible pixel value may be determined using the formula of $2^B-1$, where B represents the number of bits in per sample.

At 608, a data structure is determined for the image file based at least in part on the set of first metric values and the set of second metric values. In some embodiments, the first metric values and the second metric values computed for each of the candidate first portions are included in a data structure. In some embodiments, the data structure comprises a vector or an array. For example, the vector is of N-dimensions, where the value of N is the product of the number of types of metrics (e.g., two, including SSIM and PSNR) and the number of candidate first portions of the image file (e.g., six, including 40%, 50%, 60%, 70%, 80%, and 90%). Thus, in the example where there are two types of metric values determined for each of six candidate first portions, N equals 12. The image file may be mathematically represented by the N-dimensional vector and may be plotted as a coordinate in an N-dimensional space.

At 610, it is determined whether the image file belongs to an existing cluster based at least in part on the data structure. In the event that the image file is determined to belong to an existing cluster of characterized images, control is transferred to 612. Otherwise, in the event that the image file is determined to not belong to an existing cluster of characterized images, control is transferred to 614. In some embodiments, a set of images has already been sorted into one or more clusters, where each cluster includes a set of one or more known images that are similar to each other. In some embodiments, each known image is represented by a corresponding data structure of N-dimensions and is sorted into a cluster based on comparisons of their respective data structures. Because each image is represented by a respective data structure of N-dimensions, each image can be plotted as a coordinate in an N-dimensional space, where coordinates associated with images that are similar to each other are located close to each other within the N-dimensional space. Using any known clustering technique, images that are within a certain closeness in the N-dimensional space may be included in the same cluster.

In some embodiments, one split point of the set of one or more predetermined candidate split points has been assigned to each such existing cluster. For example, the split point may be assigned by a user (e.g., a system administrator) to one or more images of the cluster based on a manual determination of which candidate split point associated with the minimum percentage (or other portion size-based split point) of the image yields a degraded copy of the original image that is acceptable (e.g., aesthetically pleasing to the user). Each other image in the same cluster inherits the split point assigned to the one or more images of that cluster.

If the image file for which a split point has not been stored has not been previously clustered, then the image file may be referred to as an "unknown image" or an "unknown image file." It is determined whether the unknown image belongs to any of the existing clusters of characterized images based on the values stored in the data structure. In some embodiments, the unknown image belongs to an existing cluster if the unknown image is similar to the images of the existing cluster. For example, if the (e.g., Euclidean) distance between the data structure of the unknown image and those of the one or more images in an existing cluster in the N-dimensional space is within a predetermined threshold distance, then the unknown image is determined to belong to that existing cluster. For example, if the distances between the data structure of the unknown image and those of two or more existing clusters are both within the predetermined threshold distance, then the existing cluster associated with the shorter distance to the unknown image is determined as the cluster to which the image file belongs.

At 612, a split point associated with a cluster to which the image file belongs is assigned to the image file. The unknown image file is assigned the split point that has been previously assigned to the existing cluster to which the image file is determined to belong.

However, if the distance between the data structure of the unknown image and that of any of the existing clusters is not within the predetermined threshold distance, then it represents that the image file is not similar to any known images that have been sorted into existing clusters and so a new cluster is created for the image file.

At 614, a new cluster including the image file is created. A new cluster is created for the unknown image file.

At 616, a split point associated with the new cluster is determined. In some embodiments, a split point may be assigned the new cluster by a user (e.g., a system administrator). In some embodiments, after the unknown image file is sorted into a cluster and/or assigned a split point, it is also referred to as a "known image."

At 618, a split point associated with the new cluster is assigned to the image file. The image file is then assigned the split point assigned to the new cluster. In some embodiments, at some point after the new cluster of image(s) including the image file is created, the set of known images is again sorted into the one or more clusters, including the new cluster. It is possible that images previously sorted into an existing cluster may sort into the new cluster after this new round of sorting. In some embodiments, after the re-sorting process has been performed, the new cluster is also referred to as an "existing cluster."

Figure 7:
FIG. 7 is a diagram of a data structure that includes a set of first metric values and a set of second metric values determined for an image file.

FIG. 7 is a diagram of a data structure that includes a set of first metric values and a set of second metric values determined for an image file. In some embodiments, the data structured determined in 608 of process 600 of FIG. 6 can be represented by the example of FIG. 7. In the example of FIG. 7, data structure 700 comprises an N-dimensional vector and the first and second metrics comprise SSIM and PSNR. In the example of FIG. 7, an SSIM and a PSNR value is computed for each of the candidate first portions corresponding to the six predetermined candidate split points of 40%, 50%, 60%, 70%, 80%, and 90%. $SSIM_{40}$ represents the SSIM value for the candidate first portion associated with 40%, $PSNR_{40}$ represents the PSNR value for the candidate first portion associated with 40%, $SSIM_{50}$ represents the SSIM value for the candidate first portion associated with 50%, $PSNR_{50}$ represents the PSNR value for the candidate first portion associated with 50%, and so forth. Data structure 700 may be used to mathematically represent the image file and the image file can be compared to another image file (e.g., a characterized image that has been sorted into an existing cluster) based on their corresponding data structures.

Figure 8:
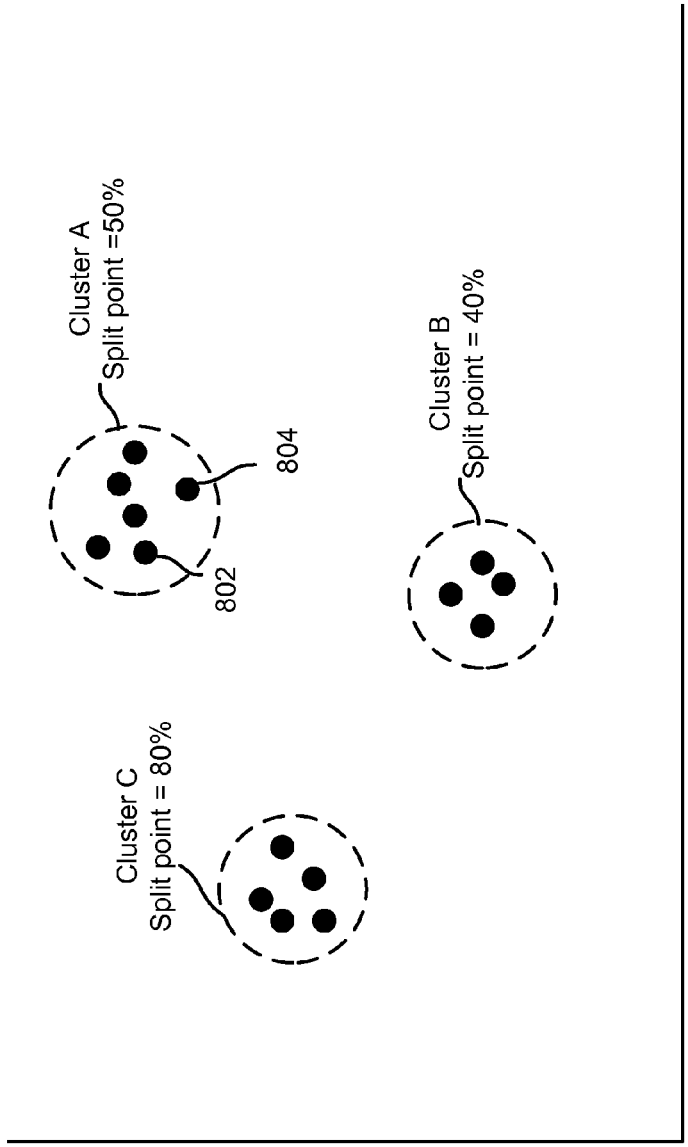
FIG. 8 is a diagram showing an example of clusters of images plotted within an N=2-dimensional space.

FIG. 8 is a diagram showing an example of clusters of images plotted within an N=2-dimensional space. While in practice, N can be chosen as any value, in the example of FIG. 8, N is selected to be equal to 2 such that the N-dimensional space can be more easily visualized. In the example plot of FIG. 8, an image is presented by a black circle. A set of images may be sorted into clusters of similar images. Where N=2, each image may be represented by a data structure that includes two values, where each value corresponds to a different dimension. FIG. 8 shows a plot of a set of images in the two-dimensional space based on the respective data structures of the set of images. Images that are similar to each other appear close together (e.g., because there is a short Euclidean distance between the data structures of such images) on the plot and can be sorted into the same cluster based on a clustering technique. For example, image 802 and image 804 are determined to be similar to each other and are therefore sorted into the same cluster, Cluster A. Other clusters of images shown in the example include Cluster B and Cluster C.

As described above, a split point is assigned to each cluster of characterized images. For example, a user assigns a split point to a cluster of characterized images by evaluating at least one image from the cluster and assigning the minimum candidate split point that the user believes yields a corresponding first portion of the image that can be rendered into an acceptable degraded copy of the original image. The remaining images of that cluster would inherit the split point assigned to the at least one image. Applying the example technique to FIG. 8, if a split point of 50% were assigned to image 802 of Cluster A, in some embodiments, image 804 and the other remaining images of Cluster A would also inherit a split point of 50% without needing to be manually evaluated by a user. Similarly, if a new image is to be added to the clusters of FIG. 8, it is determined whether the new image belongs to one of existing Clusters A, B, and C, for example, based on the distance between the new image and the characterized images. For example, if the new image were found to be within a predetermined threshold distance to Cluster C but not to Clusters A and B, then the new image would belong to Cluster C and receive the split point of 80% that was assigned to Cluster C.

However, if the new image is not found to belong to any of existing Clusters A, B, and C, then a new cluster (e.g., Cluster D, which is not shown in the diagram), may be generated for the new image.

Figure 10:
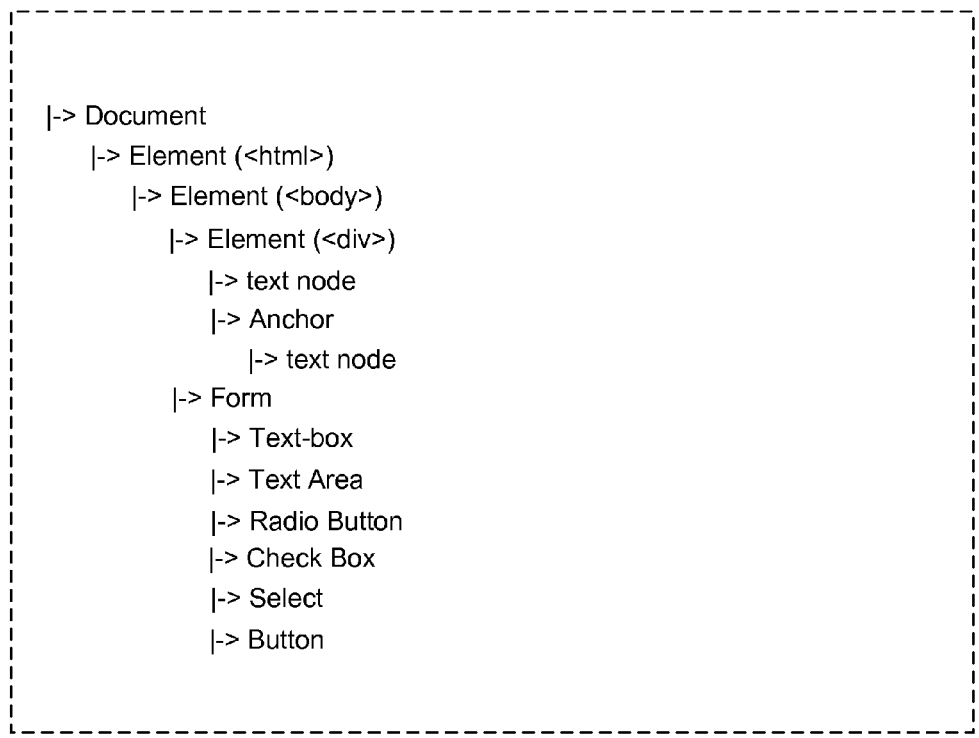
FIG. 10 is a diagram illustrating an embodiment of a DOM tree.

FIGS. 9 and 10 below describe an example of applying prioritization of the delivery of an image file by virtualizing a DOM tree.

FIG. 9 shows an example of a webpage described by an HTML file. To display webpage 900, a web browser (e.g., such as web browser 106 of system 100 of FIG. 1) sends a Hypertext Transfer Protocol (HTTP) request message to a server (e.g., such as edge server 110 of system 100 of FIG. 1) requesting the HTML webpage file. After the server locates the requested HTML webpage file, the server returns the requested HTML webpage file in an HTTP response message to the web browser. As the web browser begins to render the webpage on a screen, the web browser parses the received webpage file and builds a data structure to represent the various components of the webpage in a local memory.

The Document Object Model (DOM) is a standardized model supported by different web browsers, e.g., Internet Explorer, Firefox, and Google Chrome, to represent the various components of a webpage. The DOM tree is a cross-platform and language-independent convention for representing and interacting with objects in HTML documents, as well as XHTML and XML documents. Objects in a DOM tree may be addressed and manipulated using methods on the objects. The public interface of a DOM is specified in its application programming interfaces (APIs).

The DOM standard includes different levels. DOM core level 0 and level 1 are the core standards supported by all web browsers, while DOM levels 2 and above are extensions to DOM core level 0 and level 1, which can be optionally supported by different web browsers. DOM core level 0 and level 1 define a minimal set of objects and interfaces for accessing and manipulating document objects. It provides a complete model for an entire HTML document, including the means to change any portion of the document.

The DOM standard represents documents as a hierarchy of node objects, called a DOM tree. Some types of nodes may have child nodes of various types, and others are leaf nodes that cannot have any object below them in the document structure hierarchy.

FIG. 10 is a diagram illustrating an embodiment of a DOM tree. As shown in 1000 of FIG. 10, the topmost node, or root, of the DOM tree is the document object. A document object represents an entire HTML (or XML) document, and it provides the primary access to the document's data. The element object represents an element in the HTML document. Other types of nodes in the DOM tree may include text nodes, anchors, text-boxes, text areas, radio buttons, check boxes, selects, buttons, and the like.

For example, when the web browser (e.g., such as web browser 106 of system 100 of FIG. 1) renders webpage 900 of FIG. 9 on a screen, the web browser parses the received HTML webpage file and builds a DOM tree to represent the various components of webpage 900 of FIG. 9 in a local memory. For example, when the image tag (shown as <img src="url for image"/> in FIG. 9) is parsed by the web browser, the image is represented as an image object, and the image object is inserted into the DOM tree accordingly.

After the webpage file is parsed and the corresponding DOM tree is created, the entire DOM tree can be traversed to retrieve any dependent resources (e.g., images, audio clips, or videos) indicated by any of the nodes in the DOM tree via a network. For example, the image object corresponding to the image tag in webpage 900 of FIG. 9 redirects the web browser to fetch an image file from a uniform resource locator (URL) (e.g., associated with an origin server). Accordingly, the web browser sends a request via a network, requesting the image resource to be downloaded. There are two ways a request may be issued: statically, in which case it is the browser which manipulates the DOM; or dynamically, in which case the DOM manipulation is done by JavaScript. In response to the request, the requested dependent resource is sent to the web browser via a network.

For example, if the nodes of the DOM tree include M different resources and/or URLs, M separate GET requests (e.g., M separate HTTP GET requests) are sent via a network requesting the dependent resources to be sent to the web browser. In response, M separate GET responses (e.g., M separate HTTP GET responses) are sent to the web browser, delivering the dependent resources to the web browser.

The round trip time or network response time for a GET request to arrive at an edge server (e.g., such as edge server 110 of system 100 of FIG. 1) and for its corresponding GET response to arrive at the web browser is dependent on the latency of the network, which is different for different types of networks. The network may be any combination of different types of public or private networks, including intranets, local area networks (LANs), wide area networks (WANs), radio access networks (RANs), Wi-Fi networks, the Internet, and the like. Therefore, the latency associated with the network may vary depending on its network type(s).

Some networks have relatively lower network latency. For example, the network latency associated with WANs or Wi-Fi networks is relatively low, e.g., on the order of 10 milliseconds. Suppose the number of resources and/or URLs included in the DOM tree, M, is equal to twenty. The total network latency associated with receiving the twenty resources and/or URLs from the edge server, then, is approximately 200 milliseconds. To improve network performance, present day browsers have become more efficient in reusing connections to the same server, such that typically less than 20% of the connections may be fresh connections.

Some networks have relatively higher network latency. For example, the network latency associated with a 3rd generation mobile telecommunications (3G) network, is relatively high, e.g., on the order of 100 milliseconds. In this instance, the total network latency associated with receiving the dependent resources associated with the twenty resources and/or URLs from the edge server is then on the order of two seconds.

Since the network latency associated with different types of networks varies widely, and the web browser needs to receive the dependent resources associated with the links and URLs before the web browser can complete the rendering of webpage 900 of FIG. 9, the startup wait time experienced by the end-user of the browsing session may be insignificant in low-latency networks, such as Wi-Fi networks, but unacceptably long for an end-user in higher-latency networks, such as 3G networks. Therefore, prioritized delivery of different portions of an image in a webpage may be desirable.

Virtualization of a DOM of a web browser allows the client-server system to take control of the DOM for different kinds of optimizations, while keeping the virtualization transparent to the web browser. A web browser accesses webpages and other information through a network. When the web browser sends any network messages onto the network that are related to the downloading of webpages or other information, the messages may be either intercepted and processed by a client (e.g., such as client 104 of system 100 of FIG. 1), or directly received and then processed by an edge server supporting virtualization. Webpages or other information related to the webpages that are sent to the web browser may be intercepted, filtered, processed, or provided by the client or the edge server. In addition, method API calls by the web browser or any JavaScript code to manipulate the objects in a DOM tree may be intercepted, processed, or modified by the client. The client may also manipulate the DOM tree by making the appropriate method API calls to the DOM tree. As a result, the client and the edge server together create a virtualization engine for the DOM of the web browser. The virtualization engine may access and manipulate a DOM tree, including the creation, deletion, or update of nodes within the DOM tree. Using the virtualization engine, the delivery of the information (e.g., the order in which the information is delivered or the granularity of the information delivered) and the actual content of the delivered information corresponding to any nodes of the DOM tree may be altered, thereby speeding up the rendering of a webpage, without compromising the end-user's experience. With respect to delivering an image file to the web browser, the image file may be split into a first portion and a second portion at a split point determined for that image file; the first portion can be delivered first to avoid comprising the end-user's experience and the second portion can be delivered later or not at all.

Virtualization of the DOM of the web browser includes handling static and dynamic interactions with the DOM of the web browser. Both types of interactions may be intercepted or virtualized by the virtualization engine.

Dynamic interactions with the DOM of the web browser include interactions that are effected by JavaScripts (e.g., Ajax). The DOM of the web browser is virtualized by having the client intercept and virtualize method API calls to create, delete, or update elements in the DOM. In some embodiments, only DOM core level 1 APIs, which are supported by all standardized web browsers, are intercepted and virtualized. The DOM core level 1 APIs for manipulating the DOM tree are supplanted by the equivalent JavaScript interfaces of the virtualization engine.

Static interactions to the DOM of the web browser include interactions corresponding to static HTML tags in an HTML webpage file (e.g., the <img src="url for image"/> tag of webpage 900 as shown in FIG. 9). An HTML tag redirects the web browser to fetch a dependent resource (e.g., an image file) from a URL. Because the static GET request is not made via a JavaScript, the static request is not intercepted by the client. Instead, the static request is sent by the web browser in its native form and then routed over the network, e.g., by means of DNS resolution, to an edge server supporting virtualization.

In some embodiments, the server may discern whether a GET request is sent by the web browser or the client using a signature-based scheme, thus enabling the server to handle the static case as mentioned above. For example, if a GET request was sent by the client, the GET request would be stamped with a predetermined signature. Conversely, if the GET request was sent directly from the web browser as in the static case, the GET request would not be stamped with the predetermined signature.

In some embodiments, when a GET request is sent directly from the web browser in a static case, the server may send dummy content in response, causing the web browser to create a dummy node in the DOM tree. At the same time, the server may also notify the client, e.g., by sending a JavaScript, that a dummy node has just been created in the DOM tree, thereby eliminating the need for the client to poll the DOM tree for any new dummy nodes added to the DOM tree. The client, being notified of the newly created dummy node in the DOM tree, may dynamically update the dummy node with the actual content by issuing one or more JavaScript requests to the server. In response to the one or more requests, the server sends one or more JavaScript updates, which are then intercepted by the client, which may then populate the dummy node with the actual image content.

In some embodiments, the startup wait time of a webpage can be reduced by splitting a progressive JPEG image file (or other image files that are compressed in multiple passes of progressively higher detail) into at least two portions. Having control of both ends of the communication in a client and server system, the first portion of the image can be requested by the client and sent to the server first, and in some embodiments, then the second portion can be requested by the client and sent by the server dynamically to refresh and sharpen the image.

In some embodiments, since a webpage may include content retrieved by multiple GET requests, by dividing each GET request into a plurality of GET requests, the server transmit queue is reprioritized to transmit (and the web browser is reprioritized to render) the higher priority components of each of the GETs first. In particular, the first portion of each image to be rendered for a webpage may be prioritized higher and therefore, requested by the client earlier and/or delivered by the server earlier than the second portion of each image. As a result, the latency of an end-user seeing at least a version of each image is reduced.

Figure 11:
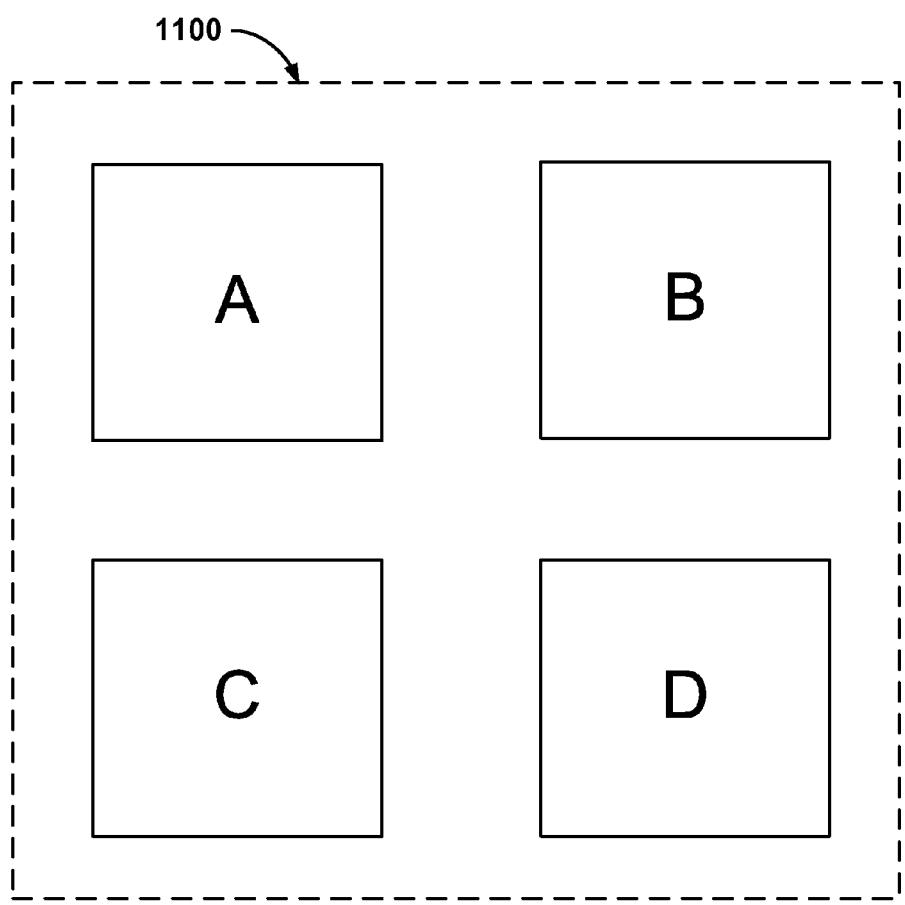
FIG. 11 is a diagram showing a webpage that includes four images to be downloaded by a web browser.

FIG. 11 is a diagram showing a webpage that includes four images to be downloaded by a web browser. In the example of FIG. 11, the four images to be downloaded for webpage 1100 during its start-up are referred to as images A, B, C, and D. Conventionally, a GET request would download an image in its entirety. Assume that in the example of FIG. 11, there are only available connection resources to support two concurrent GET requests. Because there are more images than there are available GET requests, without prioritizing the delivery of different portions of images, the two GET requests could facilitate the concurrent delivery of only two of the four images A, B, C, and D, in their entirety. As a result, the user experience would suffer as the end-user would not be able to see any of the remaining two images until the delivery of the entirety of the first two images is complete. Depending on how large the files of the first two images are, the end-user could wait a long time before being able to view any of the remaining two images during the startup of the webpage. Without prioritizing the delivery of different portions of the four images of FIG. 11, assume that the order in which the two GET requests would obtain the four images in their entirety is as follows: A, B, C, and D.

However, by prioritizing the delivery of different portions of images A, B, C, and D, the first portions of each of the four images A, B, C, and D can be delivered to the web browser first such that the end-user can at least view a degraded version of each image before any of the second portion of each image is delivered to the web browser. Thus, the two available concurrent GET requests can be used to deliver the first portion of each of images A, B, C, and D before delivering the second portions of A, B, C, and D (if needed). By prioritizing the delivery of the first portion of each of the four images, in this example, the end-user could enjoy a better experience with webpage 1100 by being able to view at least a somewhat degraded version of each image A, B, C, and D (based on the rendered first portions) sooner than the end-user would have been able to view all four images in their entirety as would have occurred without prioritizing the delivery of different portions of the images.

Assume that the first portions of the images A, B, C, and D may be represented by A1, B1, C1, and D1 and the second portions of the images of the A, B, C, and D may be represented by A2, B2, C2, and D2. By prioritizing the delivery of different portions of four images of FIG. 11, assume that the order in which the two GET requests could obtain the first and second portions of the four images would be as follows: A1, B1, C1, D1, A2, B2, C2, and D2. This way, the delivery of A1, B1, C1, and D1 are prioritized such that the end-user could more quickly view at least a version of each of images A, B, C, and D based on the renderings of A1, B1, C1, and D1. Any or all of A2, B2, C2, and D2 could be delivered at a later time, depending on one or more factors, such as end-user actions (e.g., if the end-user does not navigate away from webpage 1100).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for prioritizing delivery of different portions of images, comprising:
 a processor configured to:
  receive a request for an image file;
  identify a cluster of characterized images among a plurality of clusters of characterized images, wherein the cluster of characterized images is identified based at least in part on a similarity between the image file and a characterized image of the cluster;
  assign a split point to the image file that is associated with the identified cluster of characterized images, wherein the plurality of clusters of characterized images corresponds to respective ones of a plurality of assigned split points, wherein the split point comprises a specified portion of the image file; and
  prioritize a delivery of a first portion and a second portion of the image file to a web browser over a network based at least in part on the assigned split point, wherein the first portion of the image file is determined based at least in part on the split point assigned to the image file, wherein the first portion of the image file includes a first set of frequency components of the image file and the second portion of the image file includes a second set of frequency components of the image file, wherein the first set of frequency components is lower than the second set of frequency components, wherein to prioritize the delivery of the first portion and the second portion of the image file based at least in part on the assigned split point includes to:
   generate the first portion of the image file based at least in part on the assigned split point;
   generate the second portion of the image file based at least in part on the assigned split point; and
   deliver the first portion of the image file prior to delivering the second portion of the image file; and
 a memory coupled to the processor and configured to provide the processor with instructions.

2. The system of claim 1, wherein the image file comprises a progressive image file.

3. The system of claim 1, wherein identifying the cluster of characterized images includes to:
 determine a plurality of candidate first portions of the image file;
 determine a first set of metric values for the plurality of candidate first portions;
 determine a second set of metric values for the plurality of candidate first portions; and
 determine a data structure for the image file based at least in part on the first set of metric values and the second set of metric values, wherein the cluster of characterized images to which the image file belongs is determined based at least in part on the data structure.

4. The system of claim 3, wherein the plurality of candidate first portions of the image file is determined based at least in part on a corresponding plurality of predetermined split points.

5. The system of claim 3, wherein the first set of metric values comprises a set of structural similarity (SSIM) measures.

6. The system of claim 3, wherein the second set of metric values comprises a set of peak signal-to-noise ratio (PSNR) measures.

7. The system of claim 1, wherein to deliver the first portion of the image file prior to delivering the second portion of the image file includes to determine whether to deliver the second portion of the image file based at least in part on one or more end-user actions.

8. A method for prioritizing delivery of different portions of images, comprising:
 receiving a request for an image file;
 identifying, using a processor, a cluster of characterized images among a plurality of clusters of characterized images, wherein the cluster of characterized images is identified based at least in part on a similarity between the image file and a characterized image of the cluster;
 assigning a split point to the image file that is associated with the identified cluster of characterized images, wherein the plurality of clusters of characterized images corresponds to respective ones of a plurality of assigned split points, wherein the split point comprises a specified portion of the image file; and
 prioritizing a delivery of a first portion and a second portion of the image file to a web browser over a network based at least in part on the assigned split point, wherein the first portion of the image file is determined based at least in part on the split point assigned to the image file, wherein the first portion of the image file includes a first set of frequency components of the image file and the second portion of the image file includes a second set of frequency components of the image file, wherein the first set of frequency components is lower than the second set of frequency components, wherein prioritizing the delivery of the first portion and the second portion of the image file based at least in part on the assigned split point includes:
  generating the first portion of the image file based at least in part on the assigned split point;
  generating the second portion of the image file based at least in part on the assigned split point; and
  delivering the first portion of the image file prior to delivering the second portion of the image file.

9. The method of claim 8, wherein the image file comprises a progressive image file.

10. The method of claim 8, wherein identifying the cluster of characterized images includes:
 determining a plurality of candidate first portions of the image file;
 determining a first set of metric values for the plurality of candidate first portions;
 determining a second set of metric values for the plurality of candidate first portions; and
 determining a data structure for the image file based at least in part on the first set of metric values and the second set of metric values, wherein the cluster of characterized images to which the image file belongs is determined based at least in part on the data structure.

11. The method of claim 10, wherein the plurality of candidate first portions of the image file is determined based at least in part on a corresponding plurality of predetermined split points.

12. The method of claim 10, wherein the first set of metric values comprises a set of structural similarity (SSIM) measures.

13. The method of claim 10, wherein the second set of metric values comprises a set of peak signal-to-noise ratio (PSNR) measures.

14. The method of claim 8,
wherein delivering the first portion of the image file prior to delivering the second portion of the image file includes determining whether to deliver the second portion of the image file based at least in part on one or more end-user actions.

15. A computer program product for prioritizing delivery of different portions of images, wherein the computer program product is embodied in a non-transitory computer readable storage medium and comprising computer instructions for:
    receiving a request for an image file;
    identifying a cluster of characterized images among a plurality of clusters of characterized images, wherein the cluster of characterized images is identified based at least in part on a similarity between the image file and a characterized image of the cluster;
    assigning a split point to the image file that is associated with the identified cluster of characterized images, wherein the plurality of clusters of characterized images corresponds to respective ones of a plurality of assigned split points, wherein the split point comprises a specified portion of the image file; and
    prioritizing a delivery of a first portion and a second portion of the image file to a web browser over a network based at least in part on the assigned split point, wherein the first portion of the image file is determined based at least in part on the split point assigned to the image file, wherein the first portion of the image file includes a first set of frequency components of the image file and the second portion of the image file includes a second set of frequency components of the image file, wherein the first set of frequency components is lower than the second set of frequency components, wherein prioritizing the delivery of the first portion and the second portion of the image file based at least in part on the assigned split point includes:
        generating the first portion of the image file based at least in part on the assigned split point;
        generating the second portion of the image file based at least in part on the assigned split point; and
        delivering the first portion of the image file prior to delivering the second portion of the image file.

16. The computer program product of claim 15, wherein the image file comprises a progressive image file.

17. The computer program product of claim 15, wherein identifying the cluster of characterized images includes:
    determining a plurality of candidate first portions of the image file;
    determining a first set of metric values for the plurality of candidate first portions;
    determining a second set of metric values for the plurality of candidate first portions; and
    determining a data structure for the image file based at least in part on the first set of metric values and the second set of metric values, wherein the cluster of characterized images to which the image file belongs is determined based at least in part on the data structure.

18. The computer program product of claim 17, wherein the plurality of candidate first portions of the image file is determined based at least in part on a corresponding plurality of predetermined split points.

19. The computer program product of claim 15, wherein delivering the first portion of the image file prior to delivering the second portion of the image file includes determining whether to deliver the second portion of the image file based at least in part on one or more end-user actions.

\* \* \* \* \*

UNITED STATES PATENT AND TRADEMARK OFFICE
CERTIFICATE OF CORRECTION

PATENT NO. : 9,560,160 B1
APPLICATION NO. : 14/158324
DATED : January 31, 2017
INVENTOR(S) : Kolam et al.

It is certified that error appears in the above-identified patent and that said Letters Patent is hereby corrected as shown below:

On the Title Page

In Item (73), Assignee, delete "Instar Logic, Inc." and insert --Instart Logic, Inc.--, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*